(No Model.) 2 Sheets—Sheet 2.
J. T. STEWART.
DECORTICATING MACHINE.
No. 442,735. Patented Dec. 16, 1890.
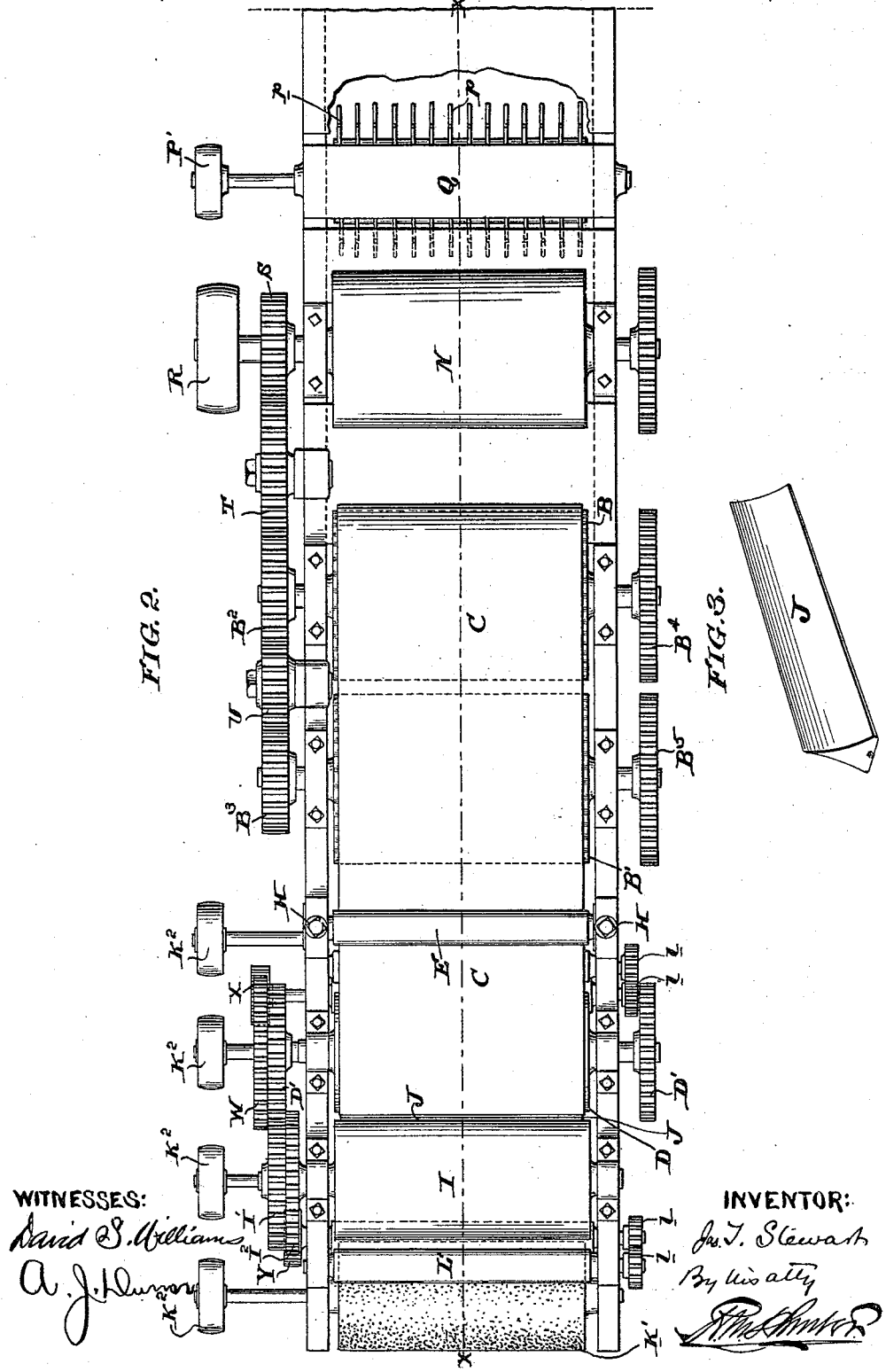
WITNESSES:
David S. Williams
A. J. Dungan
INVENTOR:
Jno. T. Stewart
By his atty

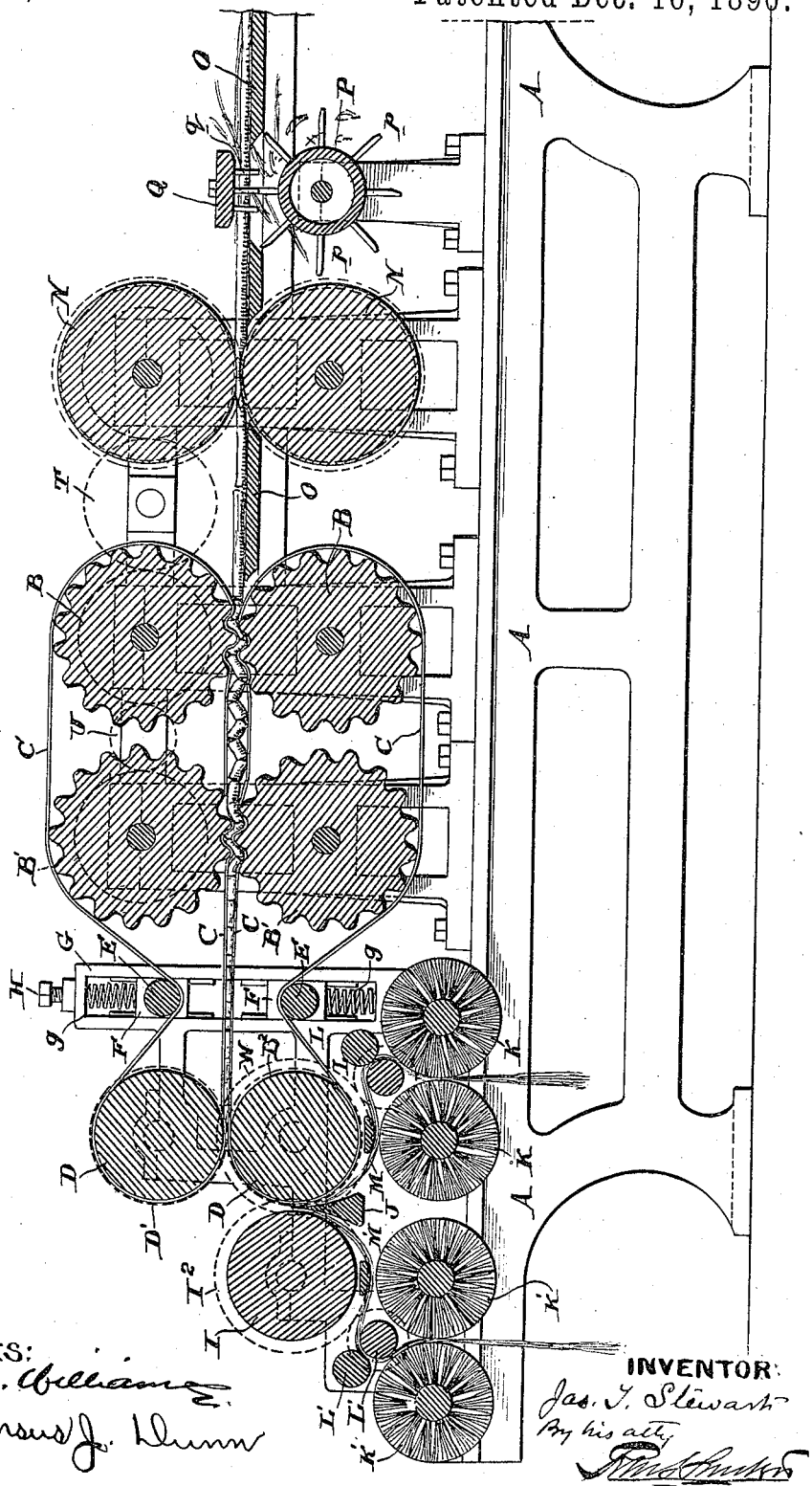

UNITED STATES PATENT OFFICE.

JAMES T. STEWART, OF PHILADELPHIA, PENNSYLVANIA.

DECORTICATING-MACHINE.

SPECIFICATION forming part of Letters Patent No. 442,735, dated December 16, 1890.

Application filed November 27, 1889. Serial No. 331,750. (No model.)

*To all whom it may concern:*

Be it known that I, JAMES T. STEWART, of Philadelphia, in the county of Philadelphia and State of Pennsylvania, have invented an Improvement in Decorticating-Machines, of which the following is a specification.

My invention has reference to decorticating-machines for the treatment of ramie, jute, or other fibrous plants; and it consists of certain improvements which are fully set forth in the following specification, and shown in the accompanying drawings, which form a part thereof.

The object of my invention is to treat stalks of ramie and similar fibrous plants in such a manner as to break or crack the woody interior without in the least injuring the fibrous covering or bark beyond splitting it longitudinally and then brushing or knocking out the cracked or broken pieces of wood, leaving the fibrous portion ready for the chemical processes to which it is to be subjected for bleaching, &c.

In decorticating-machines in which the woody interior of the plant is broken or cracked between grooved or corrugated rollers great difficulties have been met with from the tendency of the rollers, acting directly upon the plant, to bruise the fiber or to cut it transversely, and also from the liability of the rollers to become covered with the gummy matter expressed from the plants, which soon renders the machine inoperative and causes the cracked stalks to adhere to the rollers and to be carried around by them instead of passing on between them. Difficulty has also been experienced in obtaining a satisfactory breaking or cracking of the woody interior of the plants and in thoroughly knocking out this portion of the plant from the fibrous covering by means of the beaters or brushes. Ordinarily in machines of this character the wood is cracked in one direction or on one side only, so that the woody interior is not always broken up into little separate bits, which may easily be expelled or knocked out by the beaters, but is only cracked, so that the pieces often adhere together and are not easily freed from the fibrous covering.

In carrying out my invention with the object of obviating these difficulties I employ two sets of corrugated or grooved cracking or breaking rollers, over which are arranged endless bands or aprons, so that the stalks during treatment do not come into direct contact with the rollers and cannot communicate gummy matter to them or be carried about by them. The two sets of rollers are so arranged with reference to each other that the one set cracks the stalk in the one direction and the other set in the other or opposite direction, and by this double and opposite cracking action the woody portion of the plant is thoroughly cracked or broken up into small pieces. For the purpose of knocking out or expelling the woody matter the cracked stalk is fed to suitable brushes or beaters, and preferably in such a manner that the brushes or beaters act upon both sides of the material. I find it advantageous also, before treating the material to the action of the beaters or brushes, to split the cracked stalk longitudinally by means of a conveniently-arranged knife, whereby the woody interior portion of the stalk is exposed to direct contact with the brushes or beaters instead of being contained between the fibrous bark and inclosed by it, as is usual. Before the stalks are subjected to the cracking treatment between the rollers they are freed of their leaves by suitable strippers or beaters, and I prefer also to feed the stalk between flattening or crushing rollers for flattening or crushing the stalk before subjecting it to the breaking or cracking treatment. This process has the effect of more or less splitting the fibrous bark longitudinally and rendering it less liable to become bruised by the action of the cracking-rollers.

Referring to the drawings for greater particularity, Figure 1 is a longitudinal sectional view of my improved apparatus on the line $x\ x$ of Fig. 2. Fig. 2 is plan view of same, and Fig. 3 is a perspective view of the splitting-knife detached.

A is the main frame of the machine.

B B and B' B' are two sets of grooved or corrugated rollers arranged in pairs and journaled in suitable uprights of the frame A.

C C are endless bands or aprons passing over these corrugated or grooved rollers B B B' B' and over suitable guide-rollers D D, one of the bands or aprons C passing over the two upper rollers B B' and the other over the two lower rollers B B', and the two running in contact and serving to feed the stalks along and between the rollers D D. These aprons are loose, but are normally kept taut by means of the adjustable guide-rollers E, journaled in suitable sliding boxes F in an upright guide-frame G, and by means of springs $g$ spring-pressed against the aprons C C to take up the slack therein and keep them taut.

H are adjusting-screws to regulate the tension of the springs $g$ upon the sliding boxes F. The adjusting-screws H for the lower rollers E are not shown in the drawings. It will be seen that the aprons C C are kept taut by a spring-pressure, which, however, allows the aprons sufficient play to fit into the corrugations or grooves of the rollers B B and B' B' between the bite of said rollers.

I is a feeding-roller arranged adjacent to the lower of the rollers D, between which the crushed and broken stalks are fed.

J is a longitudinal cutter or knife arranged between the rollers I and D for the purpose of longitudinally splitting the crushed and cracked fiber.

K K are brushes or beaters arranged below the roller D for the purpose of knocking out the small pieces of wood.

L L are small feeding-rollers arranged above the brushes or beaters K K for the purpose of feeding the material between the brushes K K.

M is a stationary guide arranged between one of the brushes K and the roller D for the purpose of guiding the material to the feeding-rollers L L. By this arrangement of brushes and guides or feeding-rollers the split material is acted upon first on one side by one of the brushes or beaters K and then is fed by the rollers L L so as to bring the other side in contact with the other brush or beater K, and the rollers L L act to positively feed the material between the brushes. It is apparent that the material need not first be subjected to contact on one side with one of the brushes K before passing between the brushes, since in so passing between them it is treated upon both sides. I prefer, however, to employ the rollers L L for the purpose of obtaining a positive feed for the stalk between the two brushes; but, if desired, they may be dispensed with. Upon the other side, similarly arranged with reference to the roller I, are brushes K' K', feeding-rollers L' L', and a stationary guide M', corresponding in their arrangement and mode of operation to the parts K K, L L, and M, heretofore described. One set of brushes or beaters K K act upon that portion of the stalk that has been split and guided or fed upon one side of the knife J and the other set upon the other portion of the stalk upon the other side of the knife J.

N N are crushing and feeding rollers arranged one above the other and made smooth, between which the plants are fed for the purpose of crushing them, and thus longitudinally splitting the fiber.

O is a guide-table extending on each side of the bite of the rollers N N for the purpose of guiding the plants to and from the rollers.

P is a beater for the leaves, having projections or blades $p$, and Q is a stripper arranged above said beater and having projections or prongs $q$, the blades $p$ of the beater and the prongs $q$ of the stripper acting together to strip the stalks of their leaves before they are fed to the other parts of the machine. In this application, however, I do not claim the specific features of these leaf beating and stripping devices or of the crushing-rolls N N, as they form subject-matter of another application, Serial No. 327,114, filed on the 15th day of October, 1889.

R is the main driving or band wheel, preferably carried by the shaft of one of the rollers N. This shaft is also provided with a gear-wheel S, from which power is transmitted to a gear-wheel $B^2$, carried by the shaft of one of the grooved rollers B, by means of an intermediate gear-wheel T.

$B^3$ is a gear-wheel carried by the shaft of one of the rollers B'.

U is an intermediate gear between the wheel $B^2$ and the gear-wheel $B^3$.

The rollers B B and B' B' are respectively provided with suitable gears $B^4$ and $B^5$, whereby they are driven together.

Power is imparted to the rollers D by means of the belt or apron C, and the shafts of these rollers are provided with gears D' $D^2$ gearing together. The shaft of the roller I is provided with a gear-wheel I', gearing with the wheel $D^2$ of the shaft D, whereby motion is imparted to the roller I. The shafts of the rollers I and D are provided, respectively, with gears $I^2$ and W for driving the gears Y and X of the shafts of the feeding-rollers L and L'. These rollers L L and L' L' are respectively geared together by suitable gearings $l$ $l$.

The brushes or beaters K K and K' K' are provided with independent driving-wheels $K^2$, so that they may be driven at a high rate of speed independent of the speed of feeding of the machine.

P' is a driving or band wheel upon the shaft of the beater P for the purpose of driving it.

I prefer the details of construction which are here shown as best suited to the carrying out of my invention; but I do not limit my invention to them, as it is apparent that they may be varied in many ways without departing from the principles of it.

The operation of my improved apparatus will now be readily understood.

The plants, either in a green or dry state, are fed longitudinally between the strippers Q and the beater P, and are by them denuded entirely of their leaves. The leafless stalks are then crushed between the rollers N N, by which is effected a longitudinal splitting of the fibrous covering or bark. These crushed stalks are then fed between the aprons C C and the grooved or corrugated rollers B B, and, passing between the first pair of rollers, the woody interior of the plant is cracked or broken transversely. From this first pair of rollers the cracked stalks are conducted by the aprons C C between the second pair of grooved or corrugated rollers B' B', which are so arranged with reference to the first pair of rollers that the transverse cracking of the woody interior is accomplished in the opposite direction to the former cracking. This double cracking is such that if the wood is bent in an upward direction between the first pair of rollers it shall be bent in the opposite or downward direction between the second pair of rollers, and thus cracked on each side. This result is accomplished by arranging the two sets of rollers at such a distance apart that the engaging tooth of the second pair shall act against the bend or break of the wood made by the first pair of rollers and bend it out into the reverse or opposite direction, as illustrated in Fig. 1. By this means the wood is thoroughly broken into small bits within the fibrous covering or bark, and by the employment of the aprons or bands C C the fiber is not injured or bruised by direct contact with the rollers and no gummy matmet is communicated to them. Furthermore, by performing a double cracking and in reversed directions it is not necessary to subject the stalks to such a great pressure or squeezing action between the rollers for the purpose of breaking the woody interior as is required when the breaking or cracking is performed by a single pair of rollers, so that the bark or fibrous covering is less liable to become bruised or injured. The crushed and broken stalks are next conducted by the aprons C C between the feeding-rollers D D, where, if desired, they may be subjected to a second crushing action. Thence the stalks are conducted between the rollers D and I and are split by the knife J, which I prefer to form with curved faces, as shown in Fig. 3, for the better guiding of the split portions of the stalk on each side. By this knife the stalk is split and divided, part passing upon one side to the brushes K K and part on the other side to the brushes K' K'. This splitting action, it will be observed, exposes the woody interior to direct contact with the brushes, whereby the pieces of wood may be more readily driven out. The split material is guided by the curved face of the knife J to the first brush K, which acts upon one side of the material and guides it toward the feeding-rollers L L, between which it is fed down between the brushes K K and acted upon on both sides and thoroughly freed of its woody matter and brought in condition for treatment by the chemical processes. The guide M assists in guiding the ends of the material to the feeding-rollers L L. The other portion of the split stalk is guided by the other face of the knife J, and is treated in a similar manner by the brushes K' K'. If desired, the cracked stalks may be fed directly between the brushes K K without the previous splitting, and the stalks may be fed directly to the cracking-rollers B B and B' B' without being previously crushed between the rollers N N.

Having now described my invention, what I claim as new, and desire to secure by Letters Patent, is—

1. In a decorticating-machine, the combination, with grooved or corrugated surfaces between which the stalks are fed for the purpose of cracking the woody interior thereof, of a flexible covering for said grooved or corrugated surfaces to prevent the stalks coming into direct contact with the said surfaces during treatment.

2. In a decorticating-machine, the combination, with grooved or corrugated surfaces between which the stalks are fed for the purpose of cracking the woody interior thereof, of flexible carriers or aprons for conducting the stalks between said surfaces and arranged adjacent to said surfaces to prevent the stalks under treatment coming directly in contact therewith.

3. In a decorticating-machine, the combination of two sets of upper and lower grooved or corrugated rollers between which the stalks to be treated are successively fed for the purpose of subjecting said stalks to a double cracking of the woody interior, and two endless aprons or carriers passing respectively about the two upper and the two lower rollers to conduct the stalks to be treated between the sets of rollers.

4. In a decorticating-machine, the combination of two sets of upper and lower grooved or corrugated rollers between which the stalks to be treated are successively fed for the purpose of subjecting said stalks to a double cracking of the woody interior, two endless aprons or carriers passing respectively about the two upper and the two lower rollers to conduct the stalks to be treated between the sets of rollers and to prevent them coming directly in contact with the surfaces of the rollers, and guide-rollers for said aprons or carriers independent of said grooved or corrugated cracking-rollers.

5. In a decorticating-machine, the combination of two sets of upper and lower grooved or corrugated rollers L between which the stalks to be treated are successively fed for the purpose of subjecting said stalks to a double cracking of the woody interior, two endless aprons or carriers passing respectively about the two upper and the two lower rollers to conduct the stalks to be treated between the sets of rollers and to prevent them coming directly in contact with the surfaces of the rollers, and guide-rollers for said aprons or carriers independent of said grooved or corrugated cracking-rollers and arranged adjacent to each other, whereby the cracked stalks may be fed between them.

6. In a decorticating-machine, the combination of two sets of upper and lower grooved or corrugated rollers between which the stalks to be treated are successively fed for the purpose of subjecting said stalks to a double cracking of the woody interior, two endless aprons or carriers passing respectively about the two upper and the two lower rollers to conduct the stalks to be treated between the sets of rollers and to prevent them coming directly in contact with the surfaces of the rollers, and spring-pressed guides pressing upon said aprons or carriers for the purpose of keeping them taut and allowing them to pass between the corrugated rollers.

7. In a decorticating-machine, the combination of two sets of grooved or corrugated rollers between which the stalks to be treated are successively fed for the purpose of subjecting said stalks to a double cracking of the woody interior, and stripping devices to denude the stalks of their leaves before they are fed to the cracking-rollers.

8. In a decorticating-machine, the combination of two sets of grooved or corrugated rollers between which the stalks to be treated are successively fed for the purpose of subjecting said stalks to a double cracking of the woody interior, stripping devices to denude the stalks of their leaves, and crushing-rollers to crush said stalks before they are fed to the cracking-rollers.

9. In a decorticating-machine, the combination of cracking devices to crack the woody interior of the stalks transversely, with a knife located in the rear of the cracking devices to split said stalks longitudinally after they are delivered from the cracking devices.

10. In a decorticating-machine, the combination of cracking devices to crack the woody interior of the stalks transversely, with a knife located in the rear of the cracking devices to split and divide said stalks longitudinally after they are delivered from the cracking devices, and separate bearers for said split and divided portions of the stalk to knock out the woody matter therefrom.

11. In a decorticating-machine, the combination of cracking devices to crack the woody interior of the stalks transversely, with feeding-rollers between which the cracked stalks are fed, and a knife arranged between said feeding-rollers acting on the stalks after they have been cracked to split said cracked stalks longitudinally.

12. In a decorticating-machine, the combination of devices to crack the woody interior of the stalks transversely, a knife to split the cracked stalks longitudinally, beaters to knock out the cracked wood of said stalks, and guides to guide the cracked and split stalks to the beaters.

13. In a decorticating-machine, the combination of devices to crack the woody interior of the stalks transversely, a knife to split the cracked stalks longitudinally, two beaters to knock out the cracked pieces of wood therefrom, a guide to guide one side of said cracked and split stalks to one of said beaters, and feeding-rollers to feed said stalks between said beaters.

In testimony of which invention I hereunto set my hand.

JAMES T. STEWART.

Witnesses:
R. M. HUNTER,
ERNEST HOWARD HUNTER.